United States Patent Office 3,632,738
Patented Jan. 4, 1972

3,632,738
METHOD FOR THE X-RAY VISUALIZATION OF BODY CAVITIES AND A PREPARATION FOR CARRYING OUT THE METHOD
Björn G.-A. Ingelman, Uppsala, Sweden, assignor to Pharmacia AB, Uppsala, Sweden
No Drawing. Filed Dec. 26, 1968, Ser. No. 787,214
Claims priority, application Sweden, Dec. 28, 1967, 17,897/67
Int. Cl. A61k 27/08
U.S. Cl. 424—5         24 Claims

ABSTRACT OF THE DISCLOSURE

Compositions which comprise at least one iodine compound of the formula:

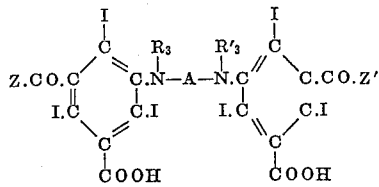

wherein Z and Z' are each either amino groups of the formula

—$NR_1R_2$ wherein $R_1$ and $R_2$ are each hydrogen or a lower alkyl having no more than 5 carbon atoms; or Z and Z' are each amino groups of the formula

wherein $R_1$ and $R_2$ are linked together into a heterocyclic ring system; and $R_3$ and $R'_3$ are each a lower acyl having no more than 5 carbon atoms; and wherein A is an alkylene group substituted by at least one substituent of the formula —O—$R_4$, wherein $R_4$ is either hydrogen; lower alkyl; or lower acyl having no more than 5 carbon atoms, the alkylene group containing 3–20 carbon atoms, and being optionally broken by one or more oxygen bridges, or a physiologically acceptable salt thereof. Such compositions are useful as X-ray contrast compositions and are administered to the body of the test object for the X-ray visualization of the body cavity.

The present invention is concerned with a method for the X-ray visualization of body cavities and a preparation for carrying out the method.

The method according to the invention is characterized in that there is administered to the body of the test object a preparation comprising or consisting of one or more iodo compounds of the formula

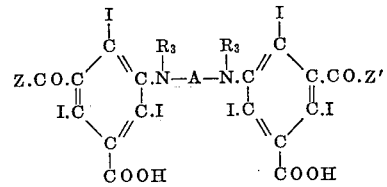

wherein Z and Z' each represent an amino group of the formula

—$NR_1R_2$ wherein $R_1$ and $R_2$ each represent hydrogen or lower alkyl having no more than 5 carbon atoms, or $R_1$ and $R_2$ together with the association nitrogen atom form members of a heterocyclic ring system, and $R_3$ and $R'_3$ each represent lower acyl having no more than 5 carbon atoms, and A is an alkylene group substituted by one or more substituents of the formula —O—$R_4$, wherein $R_4$ is hydrogen or a lower alkyl or acyl group having no more than 5 carbon atoms, the alkylene group containing 3–20, for example 3–15 carbon atoms and being optionally broken by one or more oxygen bridges, or physiologically acceptable salts thereof. In the above formulas Z and Z' may be the same or different. The former case is the most usual. This also applies to the symbols $R_3$ and $R'_3$.

In a preferred embodiment each nitrogen atom in the bridge

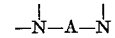

is situated at a distance of two carbon atoms from a group of the formula —O—$R_4$. Preferably not more than one oxygen atom is bound to one and the same carbon atom in the bridge A. The bridge A suitably contains 3–10 carbon atoms in the alkylene group.

Examples of substituent $R_1$ are hydrogen, methyl or ethyl, of substituent $R_2$ hydrogen, methyl or ethyl and of substituents $R_3$ and $R'_3$ acetyl or propionyl. $R_4$ is preferably chosen in the form of hydrogen when hydrophilic compounds are desired. Consequently, $R_4$ is selected in the form of hydrogen in the majority of the fields of use. When desiring compounds which present more lipophilic properties $R_4$ is selected in the form of lower alkyl or acyl group, e.g. methyl or ethyl or acetyl or propionyl. Z and Z' may, for instance, each be piperidyl or morpholinyl.

The following are examples of the bridge A in the formulae:

—$CH_2 . CH(OH) . CH_2$— or
—$CH_2 . CH(OH) . CH_2 . O . CH_2 . CH(OH) . CH_2$— or
—$CH_2 . CH(OH) . CH_2 . O . CH_2 . CH_2 . O . CH_2 . CH(OH) . CH_2$— or
—$CH_2 . CH(OH) . CH_2 . O . (CH_2)_4 . O . CH_2 . CH(OH) . CH_2$— or

—$CH_2 . CH(OH) . CH_2 . O . \overset{CH_3}{\underset{|}{CH}} . CH_2 CH_2 . O . CH_2 . CH(OH) . CH_2$— or —$CH_2 . CH(OH) . CH_2 . O . CH_2 . CH_2 . O . CH_2 . CH_2 . O . CH_2 . CH(OH) .$
$CH_2$— or
—$CH_2 . CH(OH) . CH_2 . O . CH_2 . CH(OH) . CH_2 . O . CH_2 . CH(OH) .$
$CH_2$—
—$CH_2 . CH(OH) . CH(OH) . CH_2$— or
—$CH_2 . CH(OH) . CH_2 . CH_2 . CH(OH) . CH_2 . O . (CH_2)_2 . O . CH_2 .$
$CH(OH) . CH_2 . O . CH_2 . CH(OH) . CH_2$— or
—$CH_2 . CH(OH) . CH_2 . O . CH_2 . CH(OH) . CH_2 . O . (CH_2)_4 . O . CH_2 .$
$CH(OH) . CH_2 . O . CH_2 . CH(OH) . CH_2$—, or any of the above bridges in which one or more hydroxyl groups are alkylated or acylated with a lower alkyl or acyl group having no more than 5 carbon atoms, e.g. methyl or ethyl or acetyl or propionyl.

Examples of salts of the aforementioned compounds are sodium salts, methylglucamine salts, trishydroxymethyl amino methane salts, or other non-toxic salts. These can be used in the form of an aqueous solution.

Examples of such compounds are:

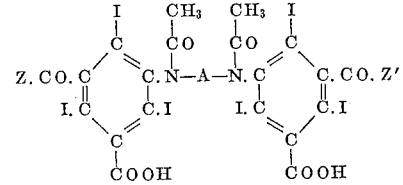

wherein Z and Z' are each an amino group with the formula —$NR_1R_2$, wherein $R_1$ and $R_2$ are each hydrogen or methyl and wherein A is —$CH_2 \cdot CH(OH) \cdot CH_2 \cdot O \cdot (CH_2)_4 \cdot O \cdot CH_2 \cdot CH(OH) \cdot$
$CH_2$— or
—$CH_2 \cdot CH(OH) \cdot CH_2 \cdot O \cdot (CH_2)_2 \cdot O \cdot CH_2 \cdot CH(OH) \cdot$
$CH_2$— or

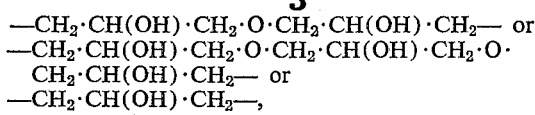

or any of the above bridges in which one or more hydroxyl groups are alkylated or acylated with a lower alkyl or acyl group having no more than 5 carbon atoms, e.g. methyl or ethyl or acetyl or propionyl, or physiologically acceptable salts thereof, such as sodium salts or methylglucamine salts.

A preparation for carrying out the method of the invention may conveniently consist of a mixture, such as an aqueous solution, or contain a physiologically acceptable solid carrier, the preparation being preferably in tablet form or in the form of some other suitable dosage unit, said mixture containing one or more of the aforementioned compounds as active contrast-producing substances. In the method of the invention, the body of the test object to which the preparation has been administered is exposed to X-rays, whereupon photographs are taken or observations made direct on a fluorescent screen or some other conventional X-ray processes are effected in a conventional manner. The dosage of the contrast-producing agent administered to the test object is selected according to the category of investigation, so that a sufficient contrast effect is obtained.

Among those body cavities which can be visualized according to the invention is the gastro-intestinal tract. In this instance, the contrast-producing substance is administered perorally in solid form or in solution. The intestines can also be visualized by administering the contrast-producing substance rectally, in the form of an enema. Another example is the visualization of blood vessels, subsequent to the injection of the contrast-producing substance in the form of a sterile solution. Subsequent to being injected intravenously, the contrast-producing agent is excreted with the urine and enables visibilization of the renal pelvis, ureters and bladders. Further examples are the use of the iodo compounds in hysterosalpingography, cholangiography, lymphography, urethrography and sialography.

The novel iodo compounds used according to the invention present a low toxicity, for instance when administered intravenously, and good characteristics as X-ray contrast-producing agents. They also present excellent stability.

Carriers for the iodo compounds may be conventional additive substances, such as water with regard to injection solutions and adjuvants when in tablet form.

If the preparation accoring to the invention is in the form of an aqueous solution the concentration of the iodo compounds is selected with respect to the category of use. Preferably a content exceeding 10 grams per 100 ml. of solution is selected. Generally, however, a much higher content is selected, e.g. in the order of 20, 30, 40 or 50 grams or more per 100 ml. of solution.

In accordance with the invention, the aforedescribed iodo compounds can be prepared by reacting compounds of the formula

Y·A·X wherein A has the aforementioned significance, $R_4$ being preferably hydrogen, and wherein Y and X are each halogen, preferably chloro or bromo, or corresponding epoxide compounds obtainable by splitting off hydrogen halide, with 1 mole of compounds of the formula

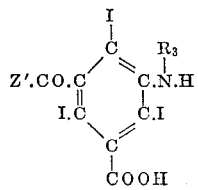

wherein Z and $R_3$ each have the above significance, or salts thereof, and with 1 mole of compounds of the formula

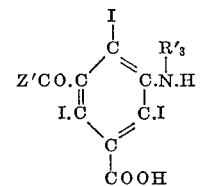

wherein Z' and $R'_3$ each have the above significance, or salts thereof. The obtained compounds are either recovered as dicarboxylic acids or in the form of physiologically acceptable salts.

Examples of such salts are sodium salts or methylglucamine salts. Sodium and methylglucamine salts have excellent solubility in water.

If $R_1$ and/or $R_2$ in Z or Z' is hydrogen, minor quantities of secondary products can be obtained as these hydrogen atoms have a certain but low reactivity. If desired, formation of such secondary products can be suppressed by selecting mild reaction conditions and an excess of the iodo monocarboxylic acids in relation to the bridge formers. (The excess hereof can be recovered and used in the next batch.) The monocarboxylic acids and said secondary products need not be removed since they are acceptable to the body. If it is preferred to avoid the formation of such secondary products entirely $R_1$ and $R_2$ are selected in the form of lower alkyl, e.g. methyl, or $R_1$ and $R_2$ together with the associating hydrogen atom are links in a heterocyclic ring system. e.g. piperidyl.

Examples of the bifunctional compounds of the type Y·A·X or corresponding epoxide compounds obtainable from Y·A·X by splitting off hydrogen halide are:

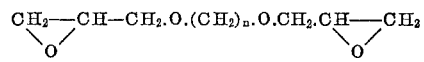

wherein $n$ is an integer from 2 to 4, and

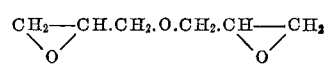

and

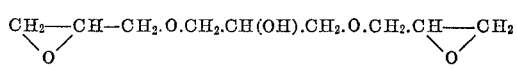

or corresponding halogen hydrins, and bifunctional glycerine derivatives of the formula $X.CH_2.CH(OH).CH_2$—Y, e.g. dichlorohydrin and dibromohydrin, or corresponding epoxy compounds obtainable by splitting off hydrogen halide and having the formula

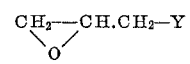

e.g. epichlorohydrin and epibromohydrin. Another example of a similar bifunctional compound is 1,2-3,4-diepoxybutane.

The reaction is preferably carried out in a solvent, e.g. water or an aqueous liquid, and there is suitably added an alkaline reacting substance, e.g. alkali metal hydroxides, the alkaline substance acting as a catalyst. In this manner the alkaline substance can also function as an acceptor for any hydrogen halide liberated during the reaction.

If it is desired to convert one or more hydroxyl groups in the bridge to alkylated or acylated hydroxyl groups the obtained compounds are treated with an alkylating substance or acylating substance, e.g. dimethylsulphate or acetic acid anhydride, in the conventional manner for alkylating or acylating hydroxyl groups.

The reaction can be conducted at different temperatures, e.g. between 0 and 50° C., such as 20° C.

The invention will now be described with reference to the following examples.

EXAMPLE 1

0.1 mole of 5-acetylamino-2,4,6-triiodo-N-methyl-isophtalic acid monoamide was dissolved in 50 ml. of an aqueous 4 N solution of sodium hydroxide. 0.05 mole of bis-/2,3-epoxypropyl/-ether was added dropwise to the solution whilst stirring, at 20° C. The reaction mixture was then allowed to stand for 1 day at 20° C., whereafter 6 N HCl was added in an amount sufficient to precipitate the dicarboxylic acid formed in the reaction. The dicarboxylic acid was cleansed by washing with water and reprecipitation, and was dried in vacuum at 50° C. The yield of dicarboxylic acid was approximately 50–60 grams. It is possible to further cleanse the obtained product by repeated dissolution and precipitation processes.

Solutions can be prepared from the obtained acid by adding water and, for instance, equivalent amounts of sodium hydroxide or methyl-glucamine.

EXAMPLE 2

0.1 mole of 5-acetylamino-2,4,6-triiodo-N-methyl-isophtalic acid monoamide was dissolved in 50 ml. of an aqueous 4 N solution of sodium hydroxide. 0.05 mole of 1,2-ethanedioldiglycide ether were added to the solution dropwise whilst stirring at 20° C. The reaction mixture was then allowed to stand for one day at 20° C., whereafter 6 N HCl was added in an amount sufficient to precipitate the dicarboxylic acid formed in the reaction. The acid was cleansed by washing with water and reprecipitation, and was dried in vacuum at 50° C. The yield of dicarboxylic acid was approximately 50–69 grams. The obtained product can be further cleansed by repeated dissolution and precipitation.

Solutions can be prepared from the obtained acid by adding water and, for instance, equivalent quantities of sodium hydroxide or methylglucamine.

EXAMPLE 3

0.1 mole of 5-acetylamino-2,4,6-triiodo-N-methyl-isophtalic acid monoamide was dissolved in 50 ml. of an aqueous 4 N solution of sodium hydroxide. 0.05 mole of 1,4-butanedioldiglycide ether was added to the mixture dropwise at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing and precipitation, and was dried in vacuum at 50° C. The yield of dicarboxylic acid was about 50–60 grams. The obtained product can be further cleansed by repeated dissolution and precipitation.

The obtained acid can be converted into salts, from which aqueous solutions can be prepared similar to what is set forth in Example 1 and Example 2.

EXAMPLE 4

In a manner similar to that set forth in Example 1, 0.1 mole of 5 - acetylamino - 2,4,6 - triiodo-N-methylisophtalic acid monoamide was reacted with 0.05 mole of epichlorohydrin or with 0.05 mole of epibromohydrin or with 0.05 mole of dichlorohydrin.

The carboxylic acid formed in the reaction is cleased in a manner similar to what is set forth in Example 1.

EXAMPLE 5

Solutions were prepared from each of the dicarboxylic acids obtained in Examples 1, 2, 3 and 4, in the following manner:

40 grams of substance and equivalent quantities of methylglucamine were dissolved in water to a solution volume of 100 ml. pH was adjusted to 7.3–7.4. The solution was filtered and poured into bottles, which were closed and sterilized in an autoclave.

EXAMPLE 6

The solutions from Example 5 were injected into the blood vessels of rabbits, whereafter these could be visibilized by X-rays and photographs. X-ray exposure and photographs of the gastro-area showed filling of contrast-producing agent in the renal pelvis, ureters and bladders.

EXAMPLE 7

Solutions from Example 5 were administered orally to rabbits, whereafter the gastro-intestinal duct was visibilized by X-rays and photographs, with excellent results.

EXAMPLE 8

Solutions of sodium salt of the compounds prepared in a manner similar to what is set forth in Example 5 and containing 20 grams of dicarboxylic acids per 100 ml. of solution were administered in the form of an enema to rabbits, whereafter the intestines were visibilized by X-rays and photographs, with good results.

What I claim is:

1. A method for the X-ray visualization of body cavities, which comprises administering to the body of the test object as a contrast-producing agent a preparation comprising at least one member selected from the group consisting of (1) iodo compounds of the formula

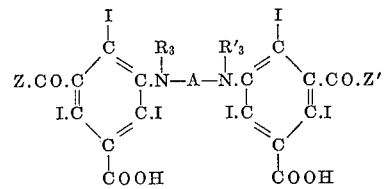

wherein Z and Z' each represent a member selected from the group consisting of amino groups of the formula $$-NR_1R_2$$

wherein $R_1$ and $R_2$ each represent a member selected from the group consisting of hydrogen and lower alkyl having no more than 5 carbon atoms, and amino groups of the formula

wherein $R_1$ and $R_2$ are linked together into a piperidyl or morpholinyl ring and $R_3$ and $R_3'$ each represent lower acyl having no more than 5 carbon atoms and wherein A is an alkylene group substituted by at least one substituent of the formula —O—$R_4$, wherein $R_4$ is a member selected from the group consisting of hydrogen; lower alkyl; and lower acyl having no more than 5 carbon atoms, said alkylene group containing 3–20 carbon atoms, and (2) physiologically acceptable salts thereof; said preparation being administered in an amount effective to give a sufficient contrast effect.

2. The method of claim 1, wherein each nitrogen atom in the bridge

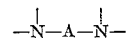

of the iodo compound is situated at a distance of two carbon atoms from a group —O—$R_4$ and wherein not more than one oxygen atom is bound to one and the same carbon atom in the bridge A.

3. The method of claim 1, wherein Z and Z' in the iodo compound are each an amino group of the formula —$NR_1R_2$, wherein $R_1$ and $R_2$ are each a member selected from the group consisting of hydrogen; methyl; and ethyl and $R_3$ and $R_3'$ are each a member selected from the group consisting of acetyl and propionyl and $R_4$ is a member selected from the group consisting of hydrogen; methyl; acetyl; and propionyl.

4. A method for the X-ray visualization of body cavities which comprises administering to the body of the test object as a contrast-producing agent a preparation comprising at least one member selected from the group consisting of (1) iodo compounds of the formula $$\begin{array}{c} \text{I} \\ | \\ \text{C} \\ \text{Z.CO.C} / \diagdown \text{C.N—A—N.C} / \diagdown \text{C.CO.Z'} \\ \text{I.C} \diagdown / \text{C.I} \quad \text{I.C} \diagdown / \text{C.I} \\ \text{C} \\ | \\ \text{COOH} \qquad \text{COOH} \end{array}$$

wherein Z and Z' each represent a member selected from the group consisting of amino groups of the formula

—NR₁R₂ wherein R₁ and R₂ each represent a member selected from the group consisting of hydrogen and lower alkyl having no more than 5 carbon atoms and amino groups of the formula $$N \diagup \begin{matrix} R_1 \diagdown \\ \vdots \\ R_2 \diagup \end{matrix}$$

wherein R₁ and R₂ are linked together into piperidyl or morpholinyl ring, and R₃ and R′₃ each represent lower acyl having no more than 5 carbon atoms and wherein A is an alkylene group substituted by at least one substituent of the formula —O—R₄, wherein R₄ is a member selected from the group consisting of hydrogen; lower alkyl; and lower acyl having no more than 5 carbon atoms, said alkylene group containing 3–20 carbon atoms and being broken by at least one oxygen bridge, and (2) physiologically acceptable salts thereof; said preparation being administered in an amount effective to give a sufficient contrast effect.

5. The method of claim 4, wherein each nitrogen atom in the bridge

—N—A—N— of the iodo compound is situated at a distance of two carbon atoms from a group —O—R₄, and wherein not more than one oxygen atom is bound to one and the same carbon atom in the bridge A.

6. The method of claim 4, wherein Z and Z' in the iodo compound are each an amino group of the formula —NR₁R₂, wherein R₁ and R₂ are each a member selected from the group consisting of hydrogen, methyl, and ethyl and R₃ and R′₃ are each a member selected from the group consisting of acetyl and propionyl and R₄ is a member selected from the group consisting of hydrogen; methyl; ethyl; acetyl; and propionyl.

7. The method of claim 4 wherein the bridge A in the iodo compound is a member selected from the group consisting of
—CH₂.CH(OH).CH₂.O.(CH₂)₄.O.CH₂.CH(OH).CH₂—
—CH₂.CH(OH).CH₂O.(CH₂)₂.O.CH₂.CH(OH).CH₂—
—CH₂.CH(OH).CH₂.O.CH₂.CH(OH).CH₂—
—CH₂.CH(OH).CH₂.O.CH₂.CH(OH).CH₂.O.CH₂.CH(OH).CH₂—
—CH₂.CH(OH).CH₂.O.CH₂.CH(OH).CH₂.O.(CH₂)₂.O.CH₂.CH(OH).CH₂.O.CH₂.CH(OH).CH₂—
—CH₂.CH(OH).CH₂.O.CH₂.CH(OH).CH₂.O.(CH₂)₄.O.CH₂.CH(OH).CH₂.O.CH₂.CH(OH).CH₂—
and the aforesaid bridges in which at least one hydroxyl group is alkylated with lower alkyl having no more than 5 carbon atoms.

8. The method of claim 4 wherein the bridge A in the iodo compound is a member selected from the group consisting of
—CH₂.CH(OH).CH₂.O.(CH₂)₄.O.CH₂.CH(OH).CH₂—
—CH₂.CH(OH).CH₂.O.(CH₂)₂.O.CH₂.CH(OH).CH₂—
—CH₂.CH(OH).CH₂.O.CH₂.CH(OH).CH₂—
—CH₂.CH(OH).CH₂.O.CH₂.CH(OH).CH₂.O.CH₂.CH(OH).CH₂—
—CH₂.CH(OH).CH₂.O.CH₂.CH(OH).CH₂.O.(CH₂)₂.O.CH₂.CH(OH).CH₂.O.CH₂.CH(OH).CH₂—
—CH₂.CH(OH).CH₂.O.CH₂.CH(OH).CH₂.O.(CH₂)₄.O.CH₂.CH(OH).CH₂.O.CH₂.CH(OH).CH₂— and the aforesaid bridges in which at least one hydroxyl group is acylated with lower acyl having no more than 5 carbon atoms.

9. A method for the X-ray visualization of body cavities, which comprises administering to the body of the test object as a contrast-producing agent a preparation comprising at least one member selected from the group consisting of (1) iodo compounds of the formula $$\begin{array}{c} \text{I} \qquad \qquad \text{I} \\ | \qquad \qquad | \\ \text{C} \qquad R_3 \quad R'_3 \quad \text{C} \\ \text{Z.CO.C} / \diagdown \text{C.N—A—N.C} / \diagdown \text{C.CO.Z'} \\ \text{I.C} \diagdown / \text{C.I} \quad \text{I.C} \diagdown / \text{C.I} \\ \text{C} \\ | \\ \text{COOH} \qquad \text{COOH} \end{array}$$

wherein Z and Z' each represent a member selected from the group consisting of amino groups of the formula

—NR₁R₂ wherein R₁ and R₂ each represent a member selected from the group consisting of hydrogen and lower alkyl having no more than 5 carbon atoms, and amino groups of the formula $$N \diagup \begin{matrix} R_1 \diagdown \\ \vdots \\ R_2 \diagup \end{matrix}$$

wherein R₁ and R₂ are linked together into a piperidyl or morpholinyl ring, and R₃ and R′₃ each represent lower acyl having no more than 5 carbon atoms and wherein A is an alkylene group substituted by at least one substituent of the formula —O—R₄ wherein R₄ is a member selected from the group consisting of hydrogen; lower alkyl; and lower acyl having no more than 5 carbon atoms, said alkylene group containing 3–10 carbon atoms, and (2) physiologically acceptable salts thereof; said preparation being administered in an amount effective to give a sufficient contrast effect.

10. The method of claim 9, wherein each nitrogen atom in the bridge

—N—A—N— of the iodo compound is situated at a distance of two carbon atoms from a group —O—R₄ and wherein not more than one oxygen atom is bound to one and the same carbon atom in the bridge A.

11. The method of claim 9, wherein the bridge A in the iodo compound is a member selected from the group consisting of —CH₂.CH(OH).CH₂—
—CH₂.CH(OH).CH(OH).CH₂—and any of the aforesaid bridges in which at least one hydroxyl group is alkylated with lower alkyl having no more than 5 carbon atoms.

12. The method of claim 9, wherein the bridge A in the iodo compound is a member selected from the group consisting of

—CH₂.CH(OH).CH₂—
—CH₂.CH(OH).CH(OH).CH₂— and any of the aforesaid bridges in which at least one hydroxyl group is acylated with lower acyl having no more than 5 carbon atoms.

13. The method of claim 9, wherein Z and Z' in the iodo compound are each an amino group of the formula —NR₁R₂, wherein R₁ and R₂ are each a member selected from the group consisting of hydrogen; methyl;

and ethyl and $R_3$ and $R'_3$ are each a member selected from the group consisting of acetyl and propionyl and $R_4$ is a member selected from the group consisting of hydrogen; methyl; ethyl; acetyl; and propionyl.

14. A method for the X-ray visualization of body cavities which comprise administering to the body of the test object as a contrast-producing agent a preparation comprising at least one member selected from the group consisting of (1) iodo compounds of the formula

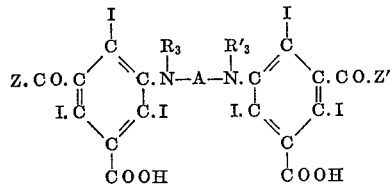

wherein Z and Z' each represent a member selected from the group consisting of amino groups of the formula

$-NR_1R_2$ wherein $R_1$ and $R_2$ each represent a member selected from the group consisting of hydrogen and lower alkyl having no more than 5 carbon atoms and amino groups of the formula

wherein $R_1$ and $R_2$ are linked together into a piperidyl or morpholinyl ring, and $R_3$ and $R'_3$ each represent lower acyl having no more than 5 carbon atoms and wherein A is an alkylene group substituted by at least one substituent of the formula $-O-R_4$, wherein $R_4$ is a member selected from the group consisting of hydrogen; lower alkyl and lower acyl having no more than 5 carbon atoms, said alkylene group containing 3–10 carbon atoms and being broken by at least one oxygen bridge, and (2) physiologically acceptable salts thereof; said preparation being administered in an amount effective to give a sufficient contrast effect.

15. The method of claim 14, wherein each nitrogen atom in the bridge

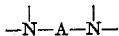

of the iodo compound is situated at a distance of two carbon atoms from a group $-O-R_4$, and wherein not more than one oxygen atom is bound to one and the same carbon atom in the bridge A.

16. The method of claim 14, wherein Z and Z' in the iodo compound are each an amino group of the formula $-NR_1R_2$, wherein $R_1$ and $R_2$ are each a member selected from the group consisting of hydrogen, methyl, and ethyl and $R_3$ and $R'_3$ are each a member selected from the group consisting of acetyl and propionyl and $R_4$ is a member selected from the group consisting of hydrogen, methyl, ethyl, acetyl and propionyl.

17. A preparation for carrying out the X-ray visualization of body cavities by being administered to the body of the test object as a contrast-producing agent a mixture which comprises an aqueous solution comprising water and at least one member selected from the group consisting of (1) iodo compounds of the formula

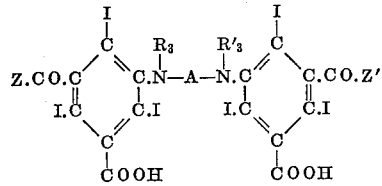

wherein Z and Z' each represent a member selected from the group consisting of amino groups of the formula

$-NR_1R_2$ wherein $R_1$ and $R_2$ each represent a member selected from the group consisting of hydrogen and lower alkyl having no more than 5 carbon atoms, and amino groups of the formula

wherein $R_1$ and $R_2$ are linked together into a piperidyl or morpholinyl ring, and $R_3$ and $R'_3$ each represent lower acyl having no more than 5 carbon atoms and wherein A is an alkylene group substituted by at least one substituent of the formula $-O-R_4$, wherein $R_4$ is a member selected from the group consisting of hydrogen; lower alkyl; and lower acyl having no more than 5 carbon atoms, said alkylene group containing 3–20 carbon atoms, and (2) physiologically acceptable salts thereof; and wherein said at least one member is present in an effective contrast producing amount.

18. The preparation of claim 17, wherein said mixture is an aqueous solution for injection purpose and oral use; and wherein said at least one member is present in an amount equal to 10 to 50 grams per 100 ml. of the preparation.

19. The preparation of claim 17 wherein said alkylene group contains 3–10 carbon atoms.

20. The preparation of claim 19, wherein said mixture is an aqueous solution for injection purpose and oral use; and wherein said at least one member is present in an amount equal to about 10 to 50 grams per 100 ml. of the preparation.

21. A preparation for carrying out the X-ray visualization of body cavities by being administered to the body of the test object as a contrast-producing agent a mixture which comprises an aqueous solution comprising water and at least one member selected from the group consisting of (1) iodo compounds of the formula

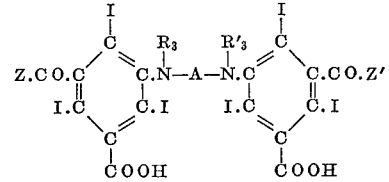

wherein Z and Z' each represent a member selected from the group consisting of amino groups of the formula

$-NR_1R_2$ wherein $R_1$ and $R_2$ each represent a member selected from the group consisting of hydrogen and lower alkyl having no more than 5 carbon atoms, and amino groups of the formula

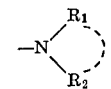

wherein $R_1$ and $R_2$ are linked together into a piperidyl or morpholinyl ring, and $R_3$ and $R'_3$ each represent lower acyl having no more than 5 carbon atoms and wherein A is an alkylene group substituted by at least one substituent of the formula $-O-R_4$, wherein $R_4$ is a member selected from the group consisting of hydrogen; lower alkyl; and lower acyl having no more than 5 carbon atoms, said alkylene group containing 3–20 carbon atoms and being broken by at least one oxygen bridge, and (2) physiologically acceptable salts thereof; and wherein said at least one member is present in an effective contrast producing amount.

22. The preparation of claim 21, wherein said mixture is an aqueous solution for injection purpose and oral use; and wherein said at least one member is present in an amount equal to about 10 to 50 grams per 100 ml. of the preparation.

23. The preparation of claim 21 wherein said alkylene group contains 3–10 carbon atoms.

24. The preparation of claim 23, wherein said mixture is an aqueous solution for injection purpose and oral use; and wherein said at least one member is present in an amount equal to about 10 to 50 grams per 100 ml. of the preparation.

References Cited

UNITED STATES PATENTS

| 3,178,473 | 4/1965 | Holtermann et al. | 424—5 |
| 2,776,241 | 1/1957 | Priewe et al. | 424—5 |
| 3,290,366 | 12/1966 | Hoey | 260—518 |
| 3,306,927 | 2/1967 | Larsen | 260—471 |

ALBERT T. MEYERS, Primary Examiner

F. E. WADDELL, Assistant Examiner

U.S. Cl. X.R.

260—519